Figures 1, 2:
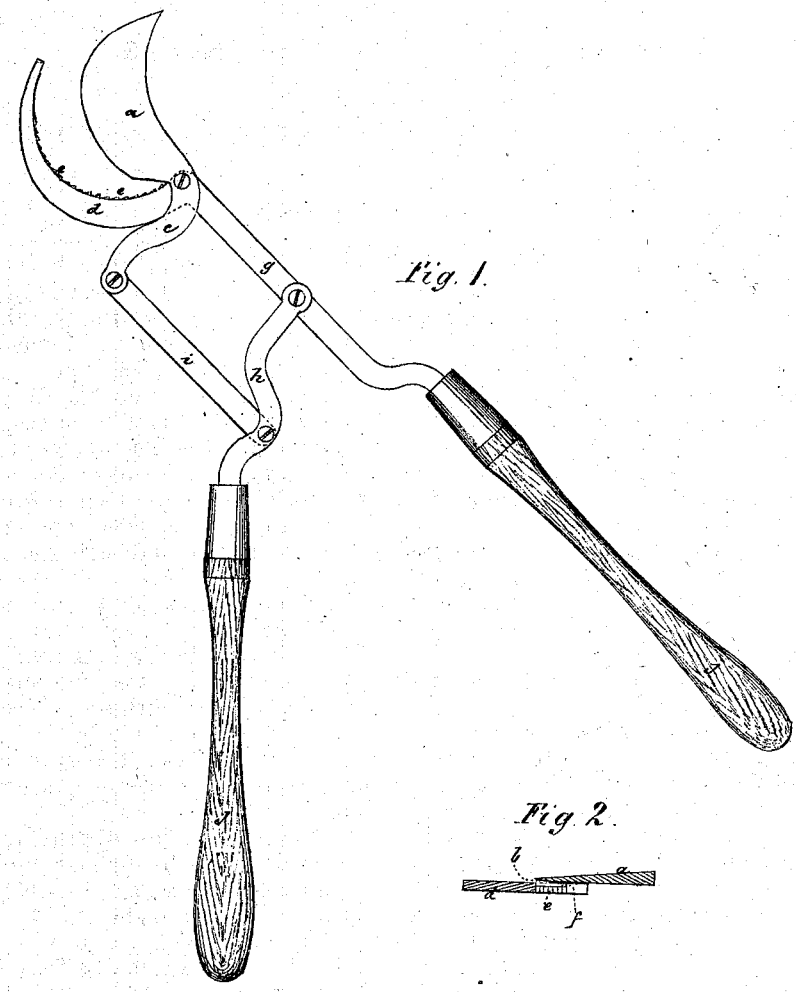

ALBERT BARLING.
Improvement in Pruning Shears.

No. 115,415. Patented May 30, 1871.

UNITED STATES PATENT OFFICE.

ALBERT BARLING, OF WEST CHESTER, PENNSYLVANIA.

IMPROVEMENT IN PRUNING-SHEARS.

Specification forming part of Letters Patent No. 115,415, dated May 30, 1871.

*To all whom it may concern:*

Be it known that I, ALBERT BARLING, of West Chester, in the county of Chester and State of Pennsylvania, have invented a new and useful Improvement in Pruning-Shears; and I do hereby declare the following to be a full, clear, and exact description of the same, reference being had to the accompanying drawing making a part of this specification, in which—

Figure 1 is a plan view; Fig. 2, a transverse section of the blade; and Fig. 3, a transverse section through the serrated hook.

This invention relates to a pruning-shears of the class in which a serrated hook or jaw is employed; and consists in constructing the fixed or hook-shaped jaw with a recess or rebate alongside the serrations, and in the general arrangement of parts, as and for the purposes hereinafter set forth.

Referring to the drawing, $a$ is the blade; $b$, the beveled edge of the same; $c$, the shank of the blade, said shank being bent forward nearly at right angles with the blade. $d$ is the serrated hook; $f$, the recess at the side of said hook, which diminishes the length of the teeth $e$ of the hook by the width of the recess. $g$ is the shank of the hook, the same being pivoted to the shank $c$ at the points of conjunction of both shanks with their blade and hook. $h$ is a lever, the end of which is jointed to the shank $g$, and which is connected by a bar, $i$, with the outer end of the shank $c$, which rod enables the lever $h$ to expend its power upon the shank $c$ in the best manner for operating the blade $a$, the point of connection between said shank and the bar $i$ being always out of the right line which joins the pivot of the shank $c$ with the point of connection between the bar $i$ and lever $h$. The lower ends of the shank $g$ and lever $h$ are turned outward away from each other, so as to prevent the handles $j$ from coming so close together as to cause hands of the operator to strike each other.

The teeth $e$ of the hook $d$ hold the bough securely while the blade is cutting it, rendering all pushing of the instrument, in order to hold the bough, unnecessary. It is necessary or essential that the inner edge of the jaw or hook $d$ should not be beveled, but square, so as to bear against the limb being cut. The shank $c$ of the jaw $a$ is bent at a right angle, so as to allow the greatest leverage through the medium of the handle $h\,j$ and link $i$. Thus, when the jaw is completing its stroke, the leverage is still very great, since the shank $c$ approximates parallelism with the shank $g$ of the fixed jaw, but in a slight degree.

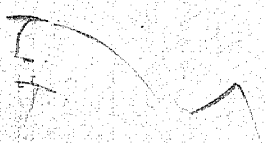

Having thus described my invention, what I claim as new, and desire to secure by Letters Patent, is—

1. The hook or jaw $d$, provided with serrations $e$ and a rebate or recess alongside thereof, its inner edge being square or right angular, as set forth and shown.

2. The movable jaw $a$ provided with shank $c$ bent at a right angle, the fixed jaw $d$ provided with serrations and a rebate, the link $i$, shanks $g\,h$, and handles $j\,j$, all constructed and arranged as shown and described.

ALBERT BARLING.

Witnesses:
SOLON C. KEMON,
THOS. D. D. OURAND.